J. P. FARNAM.
LUBRICATING SYSTEM FOR GAS ENGINES.
APPLICATION FILED FEB. 9, 1912.
1,077,823.
Patented Nov. 4, 1913.
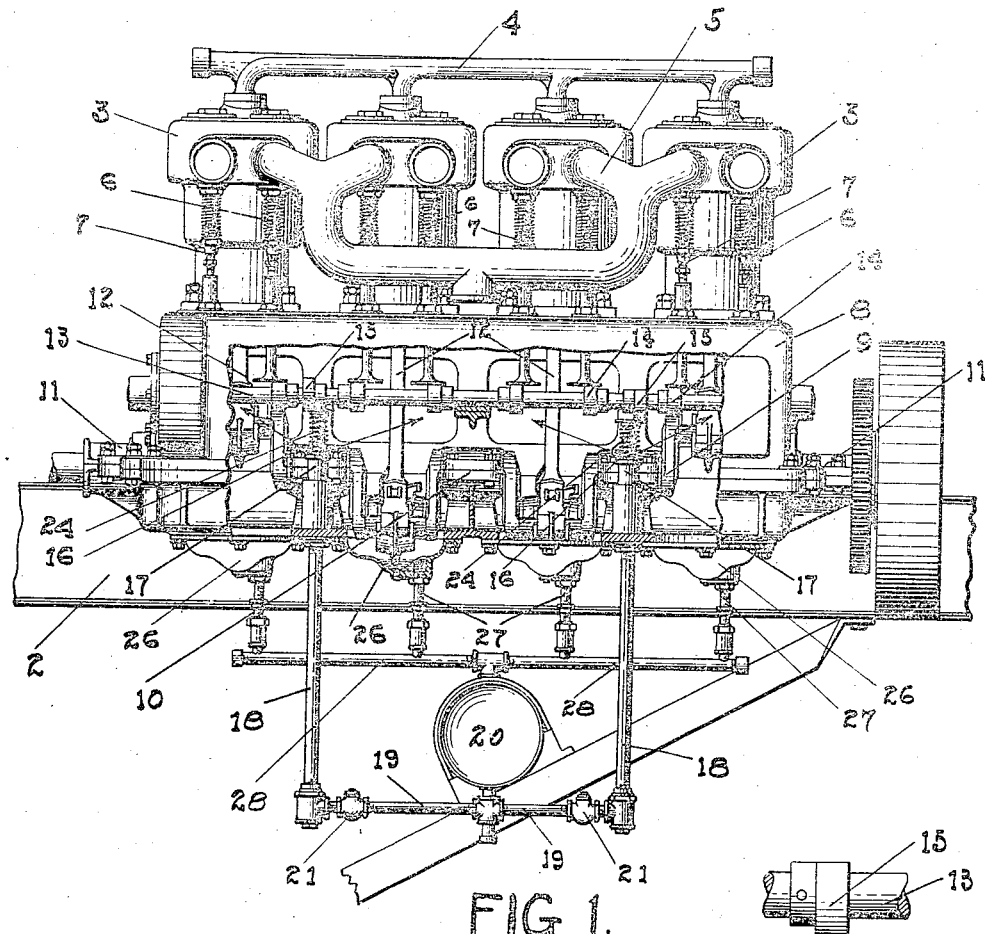
FIG. 1.
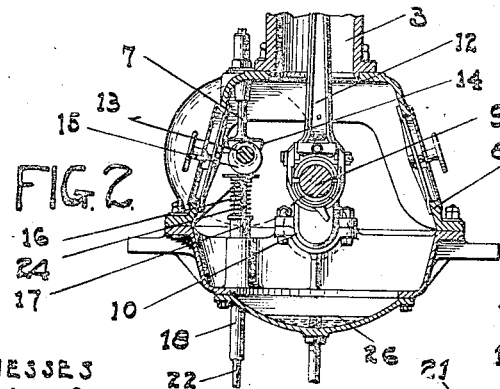
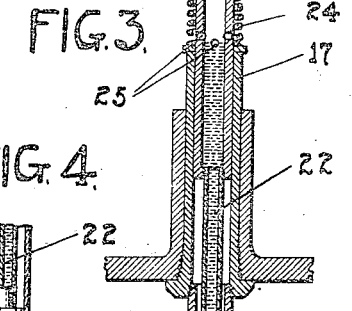
WITNESSES
INVENTOR
JULIAN P. FARNAM
BY
ATTORNEYS

UNITED STATES PATENT OFFICE.

JULIAN P. FARNAM, OF MINNEAPOLIS, MINNESOTA, ASSIGNOR, BY MESNE ASSIGNMENTS, TO EMERSON-BRANTINGHAM COMPANY, OF ROCKFORD, ILLINOIS, A CORPORATION OF ILLINOIS.

LUBRICATING SYSTEM FOR GAS-ENGINES.

1,077,823.  Specification of Letters Patent.  Patented Nov. 4, 1913.

Application filed February 9, 1912. Serial No. 676,527.

*To all whom it may concern:*

Be it known that I, JULIAN P. FARNAM, of Minneapolis, Hennepin county, Minnesota, have invented certain new and useful Improvements in Lubricating Systems for Gas-Engines, of which the following is a specification.

The object of my invention is to provide a gas engine lubricating apparatus of simple, economical construction and one which will cause the thorough lubrication of the bearing in the crank case.

My invention consists generally in various constructions and combinations, all as hereinafter described and particularly pointed out in the claims.

In the accompanying drawings forming part of this specification, Figure 1 is a side view of a gas engine with my invention applied thereto, Fig. 2 is a transverse sectional view of the crank case, Figs. 3 and 4 are detail sectional views of the mechanism for elevating and distributing the oil on the bearings.

In the drawing, 2 represents the frame, whereon the engine 3 is mounted. The engine herein shown is of the 4-cylinder type, having the usual circulating pipes 4 and manifold 5 and valves 6 and 7.

8 is the crank case and 9 a crank mounted therein. The crank case has preferably a central bearing 10 for the crank shaft and the end bearings 11 with connecting rods 12 extending from the cranks on the shaft to the pistons of the cylinder above.

13 is a cam shaft journaled near the crank and having cams 14 thereon controlling the operation of the cylinder valves and also provided with cams 15. The cam 15 is arranged to contact with the upper end of a pipe 16 that is slidable within a sleeve 17 mounted in the bottom of the crank case and adapted to receive at its lower end the threaded upper end of a pipe 18. The lower end of the pipe 18 is connected through a horizontal pipe 19 with an oil reservoir 20 that is disposed beneath the crank case, said pipe 19 having a check valve 21 therein. A tube 22 is attached to the lower end of the pipe 16 and telescopes with the pipe 18 and is provided at its lower end with a check valve 23. The pipe 16 and its connections are normally held in their raised position by a spring 24 and the wall of the said pipe 16 has holes therein. When the cam 15 revolves the pipe 16 will be forced downwardly against the tension of its spring, causing the oil in the pipe 18 to flow up into the tube 22 and fill it and the pipe 16. Then as the high part of the cam 15 moves out of engagement with the pipe 16 the said pipe will be lifted by the tension of the spring 24, the check valve 23 will close and retain the oil in the column above, and upon the next revolution of the cam the depression of the pipe 16 will cause the oil therein to be sprayed out through the ports 25 upon the bearings of the crank shaft and the connecting rods.

I have shown two of these lubricating devices in the crank case, one on each side of the center of the crank shaft and as they are substantially identical a description of one will suffice for both. When the pipe 16 rises the weight of the oil in the reservoir 20 will cause it to flow through the pipe 19 into pipe 18, maintaining a constant supply of oil therein. When the check valve 23 descends, the check valve 21 will close and prevent the escape of the oil back into the reservoir. Oil wells 26 are provided in the bottom of the crank case with overflow pipes 27 leading therefrom to a return pipe 28 which communicates with the top of the reservoir 20. The oil in these wells is lifted and thrown into the bearings in the manner common to splash lubrication.

I claim as my invention:

1. The combination, with a crank case and crank shaft, of a cam shaft and a cam thereon, an oil reservoir, an overflow pipe leading from the bottom of said crank case to said reservoir and through which the oil flows by gravity back to said reservoir, a pipe communicating with the lower portion of said reservoir and having a check valve therein, a second pipe in the path of said cam and telescoping with said first named pipe and having ports in its walls within said crank case, a spring for normally holding said second-named pipe in its raised position, said second named pipe having a check valve, the revolution of said cam shaft operating to depress said second named pipe, open its check valves and fill the pipe with oil to be sprayed therefrom upon the second engagement of said cam with said second named pipe.

2. The combination, with a gas engine crank case and a crank shaft journaled therein, of a cam shaft and cams mounted thereon, an oil reservoir disposed below the level of said crank case and having a pipe connection therewith, feed pipes projecting upwardly into said crank case and having their lower ends connected with the lower portion of said reservoir, check valves in said pipes arranged to allow the oil to flow from said reservoir and seek its level in said pipes, and spring actuated plungers mounted in said pipes and having check valves therein, said last named check valves allowing the oil to flow upwardly into said plungers upon their initial depression, the raising of said plungers closing said check valves, and the second depression of said plungers operating to discharge the oil therefrom into said crank case.

3. The combination, with a gas engine crank case and a crank shaft, of a cam shaft and cams mounted thereon, an oil reservoir arranged below the level of said crank case and having an overflow pipe connection therewith, a feed pipe connected with said crank case and with the lower portion of said reservoir, means arranged to allow the oil to flow from said reservoir and seek its level in said pipe, and a pump device operating to force the oil upwardly a predetermined distance on its initial stroke and deliver the oil to said crank case on its second stroke.

In witness whereof, I have hereunto set my hand this 30" day of January 1912.

JULIAN P. FARNAM.

Witnesses:
GENEVIEVE E. SORENSEN,
C. H. REHFUSS.